United States Patent
Houtari et al.

(10) Patent No.: US 8,845,005 B2
(45) Date of Patent: Sep. 30, 2014

(54) OPENABLE ROOF FOR A VEHICLE

(75) Inventors: Keijo J. Houtari, Fenton, MI (US);
Steven J. Lewis, Harrison Township, MI (US); Duane C. Junkin, Madison Heights, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 13/881,911

(22) PCT Filed: Oct. 27, 2011

(86) PCT No.: PCT/US2011/001816
§ 371 (c)(1),
(2), (4) Date: Apr. 26, 2013

(87) PCT Pub. No.: WO2012/057831
PCT Pub. Date: May 3, 2012

(65) Prior Publication Data
US 2013/0207412 A1 Aug. 15, 2013

Related U.S. Application Data

(60) Provisional application No. 60/455,844, filed on Oct. 27, 2010.

(51) Int. Cl.
*B60J 7/08* (2006.01)
*B60J 7/06* (2006.01)
*B60J 7/12* (2006.01)

(52) U.S. Cl.
CPC .. *B60J 7/12* (2013.01); *B60J 7/064* (2013.01); *B60J 7/061* (2013.01)
USPC ............. 296/107.13; 296/107.09; 296/107.03

(58) Field of Classification Search
USPC .......... 296/104, 107.01, 108, 107.03, 107.09, 296/107.13, 107.19, 109, 111, 114, 123
See application file for complete search history.

(56) References Cited

U.S. PATENT DOCUMENTS 5,299,850 A * 4/1994 Kaneko et al. ........... 296/107.13

FOREIGN PATENT DOCUMENTS

| DE | 19544619 A1 | 6/1997 |
| FR | 2937591 A1 | 4/2010 |
| FR | 2943281 A1 | 9/2010 |
| GB | 312485 A | 5/1929 |

OTHER PUBLICATIONS

International Search Report and Written Opinion for International Application No. PCT/US2011/001816 Filed Oct. 27, 2011.

* cited by examiner

*Primary Examiner* — Joseph D Pape
(74) *Attorney, Agent, or Firm* — Warn Partners, P.C.

(57) ABSTRACT

A captive track motion system for a convertible roof which includes a first rear side rail pivotally connected to a main frame, and an intermediate side rail pivotally connected to the first rear side rail. The first rear side rail and the intermediate side rail are part of a movable frame assembly. A roller is connected to the intermediate side rail, and a track is connected to the main frame. The roller is disposed in the track, and the movement of the roller in the track defines the movement of the movable frame assembly as the movable frame assembly is changed between a stowed position and a deployed position.

16 Claims, 3 Drawing Sheets

OPENABLE ROOF FOR A VEHICLE

CROSS-REFERENCE TO RELATED APPLICATIONS

This application is a National Stage of International Application No. PCT/US2011/001816, filed Oct. 27, 2011. This application claims priority to U.S. Provisional Patent Application No. 61/455,844 filed on Oct. 27, 2010. The disclosures of the above applications are incorporated herein by reference.

FIELD OF THE INVENTION

The present invention relates to a device used for controlling the movement of a convertible roof between a stowed position and a deployed position.

BACKGROUND OF THE INVENTION

Convertible roof tops are commonly used in sport-utility vehicles for recreational purposes. The convertible roof can typically be moved between a stowed position, and a deployed position. When in the deployed position, the convertible roof protects the occupants of the vehicle from various weather conditions. However, there are occasions where the weather is pleasant, and it is desired by the occupants of the vehicle to move the convertible roof to its stowed position such that the vehicle essentially functions without a roof, and the passenger compartment of the vehicle is exposed to the atmosphere. This allows the occupants of the vehicle to enjoy more favorable weather conditions while driving.

However, current designs for convertible roofs are often considered quite cumbersome to move between the stowed position and the deployed position. When changed from the stowed position to the deployed position, the occupant of the vehicle is required to lift and move the roof between various positions. The weight and size of the roof often increases the difficulty of moving the roof from the stowed position to the deployed position, or vice versa. Furthermore, current designs for various mechanisms that allow the convertible roof to have excessive or unnecessary degrees of freedom make the roof difficult to move between the deployed and stowed positions, and increase the potential for damage to the roof by the user.

Accordingly, there exists a need for an improvement in controlling the motion of a convertible roof for a vehicle that is capable of movement between a stowed position and a deployed position

SUMMARY OF THE INVENTION

The present invention is directed to a captive track system which controls the degrees of freedom and therefore the movement of a convertible roof between a deployed position and a stowed position.

In one embodiment, the present invention is a captive track motion system for a convertible roof which includes a first rear side rail pivotally connected to a main frame, and an intermediate side rail pivotally connected to the first rear side rail. The first rear side rail and the intermediate side rail are part of a movable frame assembly. A roller is connected to the intermediate side rail, and a track is connected to the main frame. The roller is disposed in the track, and, the movement of the roller in the track defines the movement of the movable frame assembly as the movable frame assembly is changed between a stowed position and a deployed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
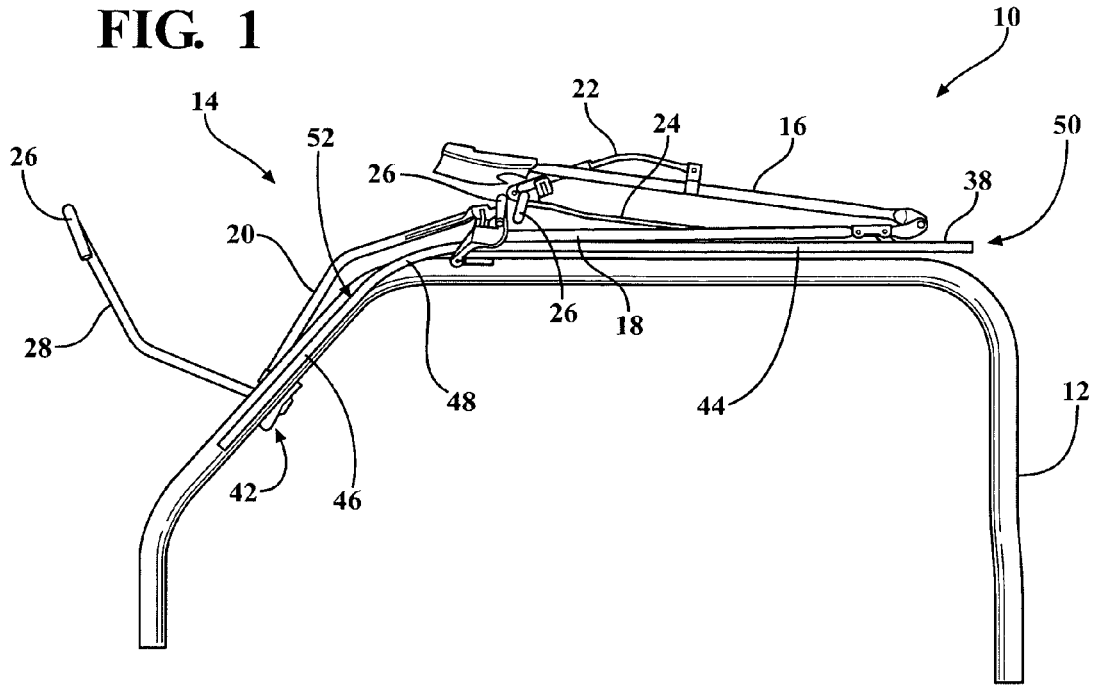
FIG. 1 is a first side view of a captive track motion system used for a convertible roof, according to the present invention.
Figure 2:
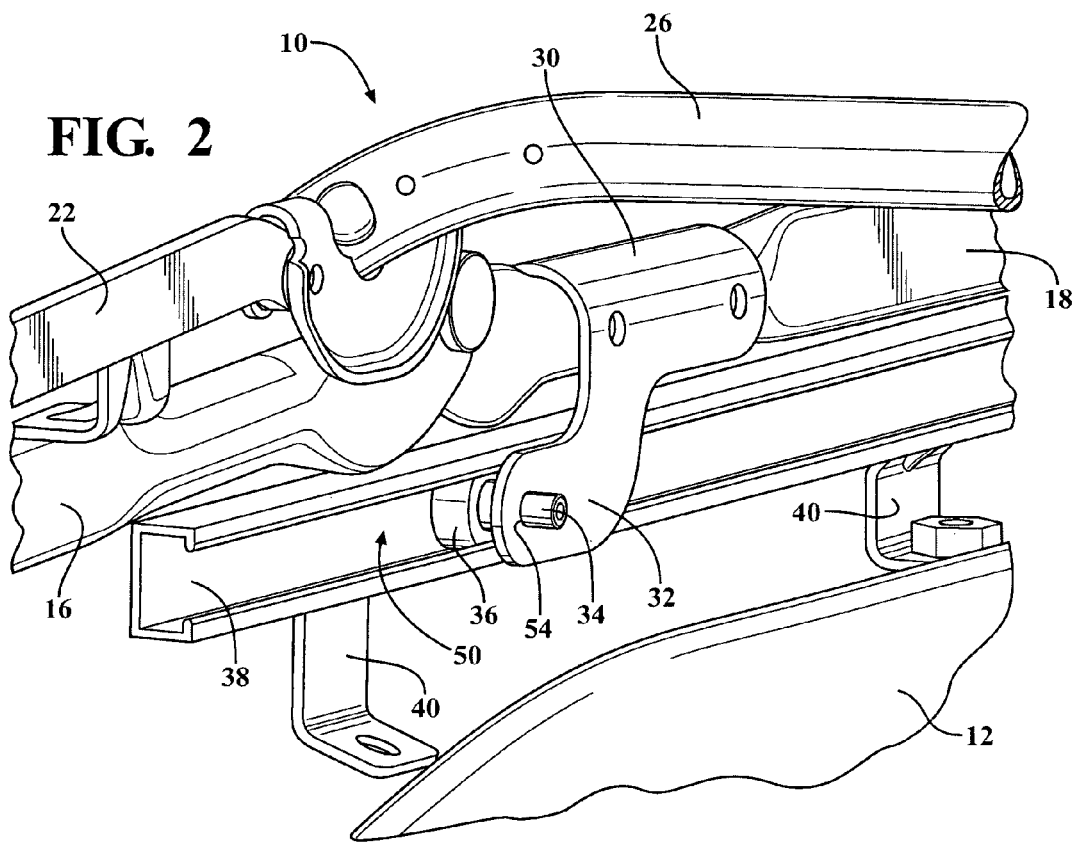
FIG. 2 is an enlarged perspective view of a captive track motion system used for a convertible roof, according to the present invention.

The following description of the preferred embodiment(s) is merely exemplary in nature and is in no way intended to limit the invention, its application, or uses.

Referring to Figures generally, a captive track motion system according to the present invention is shown generally at 10. The system 10 is attached to a vehicle (not shown), and the vehicle includes a main frame 12; the frame 12 for this particular vehicle protects the vehicle occupants in the event of an accident, or more particularly, a rollover accident. Attached to the main frame 12 is a moveable frame assembly, generally shown at 14, which is part of a convertible roof. The roof is foldable, and made of a foldable material, but is not shown for purposes of clarity. The frame assembly 14 is substantially symmetrical; therefore, only one side of the frame assembly 14 is described.

The frame assembly 14 includes various linkages, cross members, and pivot connections which are used for allowing the roof to be moved between stowed and deployed positions. More specifically, the frame assembly 14 includes a front side rail 16 pivotally connected to an intermediate side rail 18. The intermediate side rail 18 is pivotally connected to a first rear side rail 20, and the first rear side rail 20 is pivotally connected to the main frame 12. Pivotally connected to the front side rail 16 is a first support rail 22, and a second support rail 24 is pivotally connected to both the first support rail 22 and the intermediate rail 18. There are also several cross bows 26 used for supporting the roof made of foldable material, which is used for covering the interior of the vehicle upon which the convertible roof is used. One of the cross bows 26 is connected to the support rails 22,24, another of the cross bows 26 is connected to the intermediate side rail 18 and first rear side rail 20, and another of the cross bows 26 is connected to a second rear side rail 28, and the second rear side rail 28 is pivotally connected to the main frame 12.

Connected to the intermediate side rail 18 is a bracket 30 having a flange 32 which extends down and away from the bracket 30. Connected to the flange 32 is a pin 34. More specifically, the pin 34 is mounted in an aperture 54 formed as part of the flange 32. Mounted on an end of the pin 34 is a roller 36 disposed in a track 38. In this embodiment, the track 38 has a C-shaped cross-section which substantially surrounds the roller 36, but it is within the scope of the invention that other cross-sections may be suitable as well. The track 38 is connected to and supported by several mounts 40, and the mounts 40 are connected to the main frame 12. The track 38 extends along a portion of the frame 12 and helps to define the range of motion of the frame assembly 14, as the frame assembly 14 moves between the stowed position and the deployed position. In this embodiment, the track 38 includes a first straight portion 44 and a second straight portion 46, which are connected together by a curved portion 48 located between the first straight portion 44 and the second straight portion 46.

Figure 3:
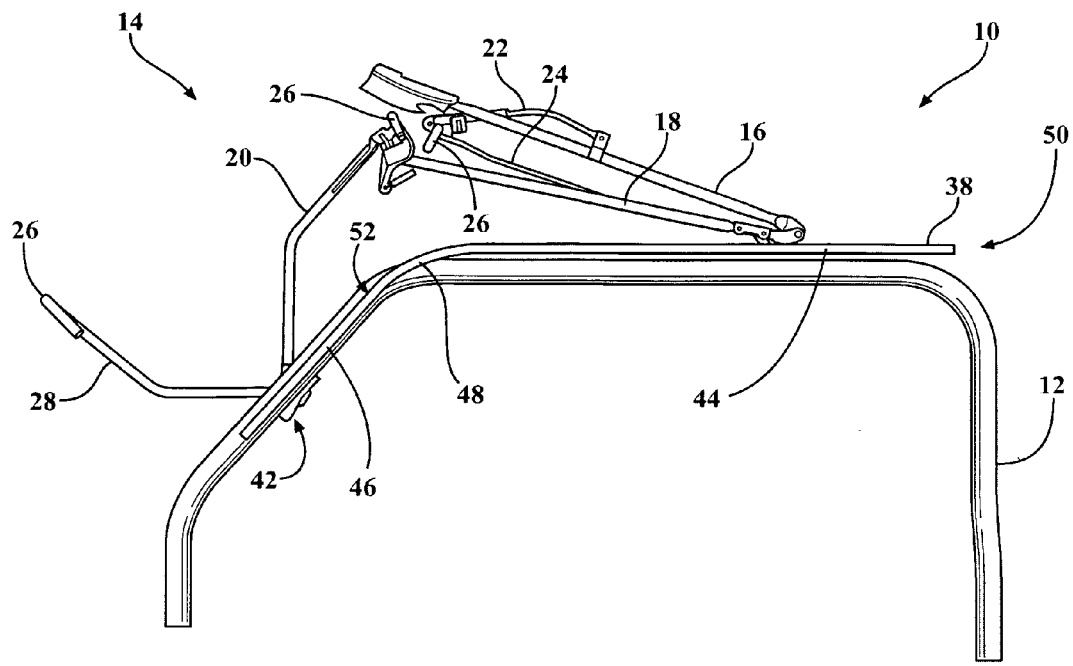
FIG. 3 is a second side view of a captive track motion system used for a convertible roof, according to the present invention.
Figure 4:
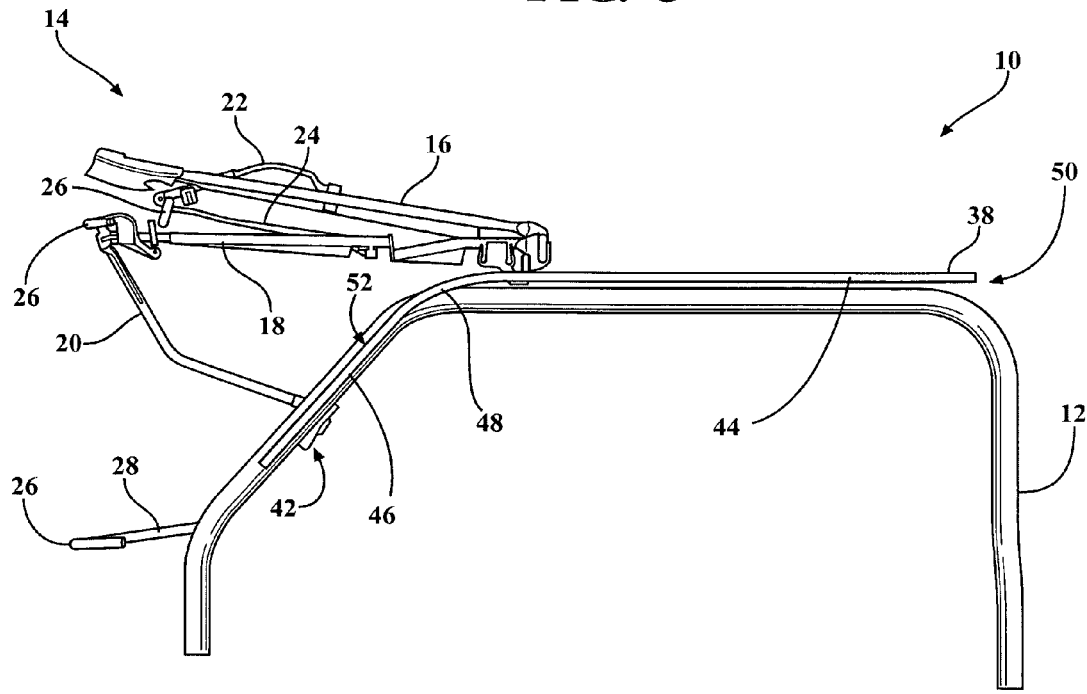
FIG. 4 is a third side view of a captive track motion system used for a convertible roof, according to the present invention.

When it is desired to move the frame assembly 14 from the deployed position to the stowed position, the front side rail 16 is pivoted relative to the intermediate side rail 18 and moved to the position shown in FIG. 1. The first rear side rail 20 is then pivoted relative to the intermediate rail 18 and main frame 12 as shown in FIG. 3. As this occurs, the roller 36 moves along the track 38 while simultaneously the first rear side rail 20 pivots relative to the main frame 12 and also moves from a first end, shown generally at 50, of the track 38 toward a second end, shown generally at 52, of the track 38. The first end 50 of the track 38 is part of the first straight portion 44, and the second end 52 of the track 38 is part of the second straight portion 46. The first rear side rail 20 and the intermediate rail 18 continue to pivot relative to one another until they are in the position shown in FIG. 5. As the first rear side rail 20 and the intermediate rail 18 are pivoted as described above, the second rear side rail 28 also pivots relative to the main frame 12. The movement of the second rear side rail 28 is controlled by a separate linkage assembly, shown generally at 42. The linkage assembly 42 may be a type of lost motion assembly, or the like, which is connected to the first rear side rail 20 and moves the second rear side rail 28 through a predefined range as the first rear side rail 20 is moved.

Figure 5:
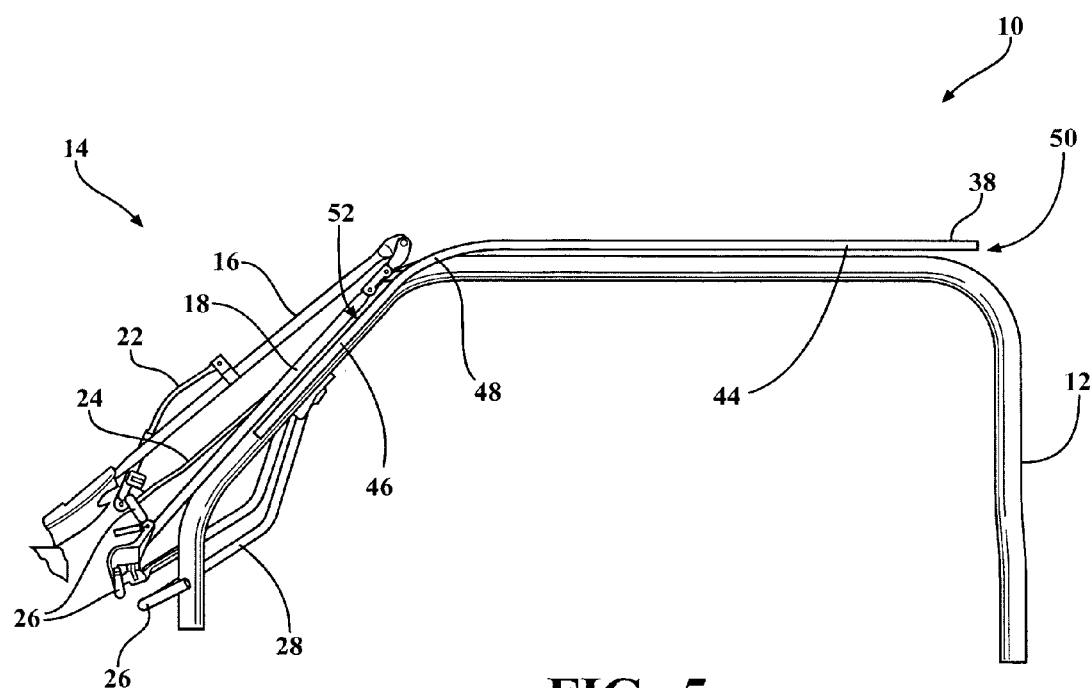
FIG. 5 is a fourth side view of a captive track motion system used for a convertible roof, according to the present invention.

The rollers 36 move along the track 38 toward the position shown in FIG. 5 when the roller 36 is at the second end 52 of the track 38. In this position, the entire frame assembly 14 is in the stowed position, exposing the interior of the vehicle to the atmosphere. The rollers 36 an the track 38 create a predefined range of motion for the first rear side rail 20 and the intermediate side rail 18, preventing the frame assembly 14 being folded improperly, and therefore preventing damage to the frame assembly 14.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A captive track motion system for a convertible roof, comprising:
    at least one track connected to a main frame of a vehicle;
    an intermediate side rail connected to said at least one track and pivotable relative to said main frame of said vehicle;
    a front side rail pivotally connected to a front end of said intermediate side rail at an attachment joint; and
    a first rear side rail pivotally connected to said intermediate side rail such that said intermediate side rail moves along said at least one track and said first rear side rail and said intermediate side rail move relative to one another in a predetermined manner as said first rear side rail is pivoted relative to said intermediate side rail.

2. The captive track motion system for a convertible roof of claim 1, further comprising:
    a bracket connected at said front end of said intermediate side rail; and
    a roller connected to said bracket, and said roller is positioned in said at least one track such that the movement of said intermediate side rail corresponds to the movement of said roller along said track.

3. The captive track motion system for a convertible roof of claim 2, wherein said intermediate side rail and said first rear side rail are part of a movable frame assembly, further comprising:
    said front side rail;
    a flange formed as part of said bracket; and
    a pin extending through an aperture formed as part of said flange, said roller mounted on said pin;
    wherein said front side rail is pivoted relative to said intermediate side rail, and said intermediate side rail is then pivoted relative to said first rear side rail and said main frame such that said roller moves in said at least one track when said movable frame assembly is moved from said deployed position to said stowed position.

4. The captive track motion system for a convertible roof of claim 1, wherein said at least one track has a substantially C-shaped cross-section.

5. The captive track motion system for a convertible roof of claim 1, wherein said at least one track is connected to said main frame of said vehicle after said vehicle has been assembled.

6. The captive track motion system for a convertible roof of claim 1, said at least one track further comprising:
    a first straight portion;
    a curved portion integrally formed with said first straight portion; and
    a second straight portion integrally formed with said curved portion;
    wherein the shape of said first straight portion, said second straight portion, and said curved portion substantially corresponds to the shape of at least a portion of said main frame.

7. The captive track motion system for a convertible roof of claim 1, said at least one track further comprising:
    a first end; and
    a second end;
    wherein a roller moves between said first end and said second end as said intermediate side rail pivots relative to said first rear side rail.

8. A captive track motion system for a convertible roof, comprising:
    a main frame;
    at least one track connected to said main frame;
    an intermediate side rail connected to said at least one track such that said intermediate side rail is movable relative to said main frame along said at least one track; and
    a first rear side rail pivotally connected to said main frame, and said first rear side rail pivotally connected to said intermediate side rail;
    wherein the movement of said intermediate side rail is controlled by the shape of said at least one track as said first rear side rail and said intermediate side rail are moved between a deployed position and a stowed position.

9. The captive track motion system for a convertible roof of claim 8, further comprising:
    a bracket connected to said intermediate side rail;
    a flange formed as part of said bracket;

a pin extending through an aperture formed as part of said flange; and a roller mounted on said pin, said roller moveable along said at least one track as said first rear side rail and said intermediate side rail are moved between said stowed position and said deployed position.

10. The captive track motion system for a convertible roof of claim 9, said at least one track further comprising:

a first end; and a second end;

wherein said roller is located in proximity to said first end of said at least one track when said intermediate side rail and said first rear side rail are in said deployed position, and said roller is located in proximity to said second end of said at least one track when said intermediate side rail and said first rear side rail are in said stowed position.

11. The captive track motion system for a convertible roof of claim 8, said at least one track further comprising:

a first straight portion;

a curved portion connected to said first straight portion; and a second straight portion connected to said curved portion;

wherein the shape of said first straight portion, said second straight portion, and said curved portion control the movement of said intermediate side rail relative to said main frame.

12. The captive track motion system for a convertible roof of claim 8, wherein said at least one track has a substantially C-shaped cross-section.

13. A captive track motion system for a convertible roof, comprising:

a main frame;

a first rear side rail pivotally connected to said main frame;

an intermediate side rail pivotally connected to said first rear side rail, said first rear side rail and said intermediate side rail being part of a movable frame assembly;

a roller connected to said intermediate side rail; and a track connected to said main frame, said roller being disposed in said track;

wherein the movement of said roller in said track defines the movement of said movable frame assembly as said movable frame assembly is changed between a stowed position and a deployed position;

wherein said movable frame assembly further comprises:

a front side rail pivotally connected to said intermediate side rail;

a bracket connected to said intermediate side rail;

a flange formed as part of said bracket; and a pin extending through an aperture formed as part of said flange, said roller mounted on said pin;

wherein said front side rail is pivoted relative to said intermediate side rail, and said intermediate side rail is then pivoted relative to said first rear side rail and said main frame such that said roller moves in said track when said movable frame assembly is moved from said deployed position to said stowed position.

14. The captive track motion system for a convertible roof of claim 13, said track further comprising:

a first straight portion;

a curved portion connected to said first straight portion; and a second straight portion connected to said curved portion;

wherein the shape of said first straight portion, said second straight portion, and said curved portion substantially corresponds to the shape of a portion of said main frame.

15. The captive track motion system for a convertible roof of claim 13, said track further comprising a first end and a second end such that when said movable frame assembly is in said deployed position, said roller is located in proximity to said first end of said track, and when said movable frame assembly is in said stowed position, said roller is located in proximity to said second end of said track.

16. The captive track motion system for a convertible roof of claim 13, wherein said track has a substantially C-shaped cross-section.

\* \* \* \* \*